United States Patent [19]

Sheridan

[11] Patent Number: 5,071,591
[45] Date of Patent: Dec. 10, 1991

[54] ANTIFOAMING AND DEFOAMING COMPOSITIONS

[75] Inventor: Geoffrey P. Sheridan, Cheshire, England

[73] Assignee: W. R. Grace & Co.-Conn., New York, N.Y.

[21] Appl. No.: 604,300

[22] Filed: Oct. 26, 1990

[30] Foreign Application Priority Data

Oct. 31, 1989 [GB] United Kingdom ............... 8924490

[51] Int. Cl.$^5$ ............................................. B66D 1/20
[52] U.S. Cl. ..................................... 252/358; 252/321
[58] Field of Search ............................ 252/358, 321

[56] References Cited

U.S. PATENT DOCUMENTS

| | | | |
|---|---|---|---|
| 3,869,412 | 3/1975 | Waag .................................... | 252/527 |
| 3,909,445 | 9/1975 | Ernst .................................... | 252/321 |
| 3,933,672 | 1/1976 | Bartolotta et al. .................. | 252/116 |
| 4,001,132 | 1/1977 | Maguire, Jr. ........................ | 252/105 |
| 4,104,186 | 8/1978 | Caffarel et al. ..................... | 252/89 R |
| 4,123,395 | 10/1978 | Maguire, Jr. et al. .............. | 252/559 |
| 4,202,795 | 5/1980 | Burnham et al. ................... | 252/332 |
| 4,299,690 | 10/1981 | Allan ................................... | 208/188 |
| 4,382,013 | 5/1983 | Kaneko et al. ..................... | 252/354 |
| 4,411,775 | 10/1983 | McCoy et al. ...................... | 208/188 |
| 4,450,001 | 5/1984 | Kaneko et al. ..................... | 71/118 |
| 4,464,193 | 8/1984 | Kaneko et al. ..................... | 71/83 |
| 4,517,102 | 5/1985 | Salathiel ............................. | 252/8.55 R |
| 4,600,523 | 7/1986 | Piorr et al. ......................... | 252/174.22 |
| 4,895,681 | 1/1990 | Hermann et al. ................... | 260/410.6 |
| 4,933,176 | 6/1990 | van Reeth .......................... | 424/70 |
| 4,968,448 | 11/1990 | Svarz .................................. | 252/358 |
| 4,973,423 | 11/1990 | Geke et al. ......................... | 252/174.21 |

*Primary Examiner*—Robert L. Stoll
*Assistant Examiner*—N. Bhat
*Attorney, Agent, or Firm*—James P. Barr

[57] ABSTRACT

An aqueous defoaming/antifoaming composition which comprises:

(a) from 5 to 75 parts by weights of a water-soluble non-ionic polyoxyalkylene condensate derived from an active hydrogen-containing precursor or an ester thereof and from at least two alkylene oxides, (b) a water-soluble aromatic sulphonate salt of the formula:

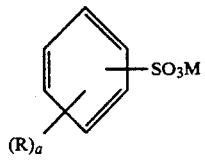

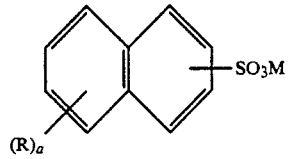

where a is 1 or 2, R is a $C_1$-4 alkyl group which may be the same or different when a is 2 and M is a cation, such that the weight ratio of (b) to (a) is at least 1:15, and (c) from 20 to 90 parts by weight of water.

25 Claims, No Drawings

ANTIFOAMING AND DEFOAMING COMPOSITIONS

This invention relates, in general, to antifoaming and/or defoaming compositions. More particularly, the invention relates to new and improved liquid antifoaming and/or defoaming compositions.

The formation of foam during many industrial processes has been and continues to be a serious problem to manufacturers. Consequently substantial technical disadvantages arise in the manufacture and use of adhesives, the manufacture of pulp and paper, in the formulation of latex paints, in sugar production, in various fermentation processes and in many other commercial and industrial processes because certain of the solutions and dispersions employed in these processes tend to froth and foam.

In all of these processes precautions must be taken to prevent, or at least deter, the formation of foam. The disadvantages which accrue from the tendency of various solutions and dispersions to foam are of such magnitude that at the present time a substantial amount of research has been directed towards this problem.

As a result a very large number of compositions have been developed in the art and recommended for use as anti-foaming and/or defoaming agents in commercial and industrial processes.

However, since the processes which require the use of antifoaming and/or defoaming agents are so many and so varied and the materials involved in these processes are so different, few of the compositions suggested by the art have all the properties necessary to render them completely satisfactory.

Primarily, the value of a new anti-foaming or defoaming agent is measured by its ability to prevent or to at least inhibit the formation of foam.

This result should be achieved at the minimum inhibitory level so as to avoid any adverse effects on either the process itself or the finished product produced. Such adverse effects can manifest themselves in varying forms from difficulties in sizing or coating paper, malformation in surface coating or toxicity to micro-organisms resulting in reduced yields in fermentation processes.

It is the object of this invention to provide new and improved antifoaming and/or defoaming compositions. More particularly, it is the object of this invention to provide liquid antifoaming and/or defoaming compositions which are superior in their defoaming ability to that of conventional antifoaming and/or defoaming compositions.

It is well known in the art that many polyoxyalkylene glycol ethers and/or esters are useful antifoaming and/or defoaming agents for many industrial processes. We have discovered, according to the present invention, that when particular polyoxyalkylene glycol ethers and/or esters are used in the presence of certain aromatic hydrocarbon sulphonate then an enhancement in antifoaming and/or defoaming behaviour takes place, characterised by their ability to function at much lower concentrations (e.g. 50-100%) below that expected and achieved with the polyoxyalkylene glycol ether and/or esters alone. Such an advantage not only renders such compositions more economically viable but allows them to be used in applications where higher levels would normally result in adverse effects on other parts of an industrial process.

Accordingly, the present invention provides a liquid defoaming/antifoaming composition which comprises:
(a) from 5 to 75 parts by weight of a water-soluble non-ionic polyoxyalkylene condensate drived from an active hydrogen-containing precursor or an ester thereof and from at least two alkylene oxides,
(b) a water-soluble aromatic sulphonate salt of the formula:

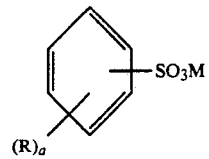

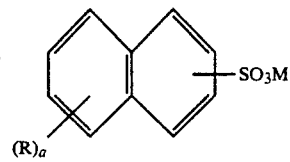

where a is 1 or 2, R is a $C_1$-4 alkyl group which may be the same or different when a is 2 and M is a cation, such that the weight ratio of (b) to (a) is at least 1:15, and
(c) from 20 to 90 parts by weight of water.

The compositions of this invention contain, as an essential ingredient, one or more polyoxyalkylene condensates derived from at least two alkylene oxides and a hydrogen-containing precursor or an ester thereof. The active hydrogen-containing precursor may be, for example, an alkylphenol, alcohol, fatty acid, amine, glycol or glycerol.

Polyoxyalkylene condensates which are advantageously employed in the compositions of this invention include the following:

1. Alkyl polyoxypropylene polyoxyethylene condensates having the formula:

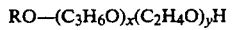

or

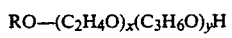

where R is a $C_1$-$C_{22}$, preferably $C_8$-$C_{18}$, alkyl or alkenyl group, especially cetyl and oleyl, and x and y each independently represent an integer from 2 to 98, preferably 5 to 40.

2. Polyoxypropylene-polyoxyethylene condensates having the formula:

or

where y or $y+y_1$ is a number which equals at least 15, preferably at least 30 and x or $x+x_1$ is a number such that $(C_2H_4O)$ represents 5-60%, preferably 10-40%, of the total compound weight.

3. Other polyoxypropylene-polyoxyethylene condensates derived from trifunctional, tetrafunctional and hexafunctional initiators such as glycerol, pentaerythritol and sorbitol.

Preferred products are those based on trifunctional initiators such as glycerols having the formula:

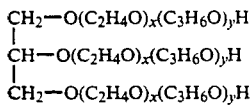

where x and y each independently represent an integer from 3 to 90, preferably 5 to 30 with a total compound molecular weight of 400 to 9,000, preferably 2,000 to 5,000.

4. Esters produced by reacting any of the above polyoxyalkylene condensates with a carboxylic acid with 2 to 22, preferably 2 to 18, carbon atoms. For example, esters prepared by reacting these polyoxyalkylene glycol ethers with acetic acid, caprylic acid, lauric acid, stearic acid or oleic acid are very suitable for use in the compositions of this invention.

Another essential component of our composition is a water-soluble salt of a mono- or di-alkyl substituted aromatic hydrocarbon sulphonic acid, having the formula:

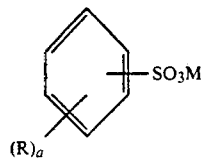

or

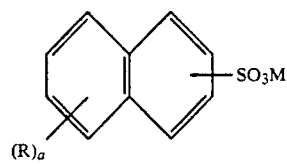

where a is 1 or 2, R is a $C_1$-$C_4$ alkyl group, especially methyl, which may be the same or different when a is 2 and M is an alkali metal, ammonium or alkanolamine radical, typically derived from monoethanolamine, diethanolamine or triethanolamine, or any other cation, the salt of which is water-soluble. The sulphonate preferably has a molecular weight from 200 to 300.

Preferred components are those based on mono- or di-methyl substituted benzene such as toluene or xylene or mono- or di-methyl substituted naphthalene and where M is sodium.

The defoaming compositions of the present invention generally comprise the polyoxyalkylene glycol ethers and/or esters together with the aromatic hydrocarbon sulphonates in a weight ratio of 15:1 to 1:15, preferably 6:1 to 1:6, in water at total active concentrations or, say, 10 to 80%, preferably 20 to 60%, by weight.

The compositions of the invention may, if desired, contain various additives to improve or modify their properties; typical such aditives include cloud point elevators such as anionic wetting agents provided they do not interfere with the performance of said compositions, e.g. fatty acid sulphonates, alkyl ether phosphates and alkyl sulphosuccinates or low molecular weight glycols or alcohols such as propylene glycol or isopropanol, as viscosity modifiers.

Preferably these optional ingredients comprise no more than 10% by weight of the compositions.

When the composition is used will be dependent largely on the system to be treated. Thus in sugar processing it will normally be added to prevent foam forming. In contrast in fermentation processes it will normally be added when foam occurs. In general, the compositions are more effective when added before any foaming i.e. as preventors.

Likewise the amounts of the compositions used will vary. Typically in paper manufacture from 5 to 100 ppm of composition is used in sugar extraction from 10 to 150 ppm, in fermentation processes from 50 to 500 ppm and in surface coating applications from 250 to 1000 ppm.

Of course it is possible to add the active ingredients separately to the system to be treated although this will generally be less convenient. Accordingly the present invention also provides a method of treating an aqueous medium so as to reduce or prevent foaming which comprises applying thereto a non-ionic polyoxyalkylene condensate derived from an active hydrogen-containing precursor or an ester thereof and at least two alkylene oxides and a water-soluble aromatic sulphonate as defined above such that the weight ratio of salt to condensate is at least 1:15.

The following Examples, in which all percentages are by weight of the composition, further illustrate the present invention, all percentages are by weight unless otherwise specified.

EXAMPLE 1

A defoamer composition was prepared by taking 25% of a cetyl oleyl alcohol condensed with 40 moles of propylene oxide and 5 moles of ethylene oxide, 15% sodium xylene sulphonate and 60% water.

The composition was evaluated for its defoaming efficiency by recirculation in 500 cc of a 0.2% saponin solution at 32° C. for 15 minutes.

It was found that only 80 ppm of this product was required to depress the foam formed from a height of 500 mm to zero whilst the cetyl oleyl condensate alone required in excess of 150 ppm to reduce the foam to a height of 100 mm.

EXAMPLE 2

A defoamer composition was prepared by taking 25% of glycerol condensed with 15 moles of ethylene oxide and 65 moles of propylene oxide, 25% sodium xylene sulphonate and 50% water.

The composition was examined in 2 liter yeast (S. cerevisiae) fermentations at 30° C. for 20 to 23 hours. . The final dosage required for complete control was 200 ppm compared with 532 ppm for the glycerol condensate alone.

EXAMPLE 3

A defoamer composition, prepared as in Example 2 but replacing the glycerol condensate with its corresponding acetic acid ester, required 135 ppm compared with 208 ppm for the acetic acid ester alone.

EXAMPLE 4

A defoamer composition, prepared as in Example 2 replacing the glycerol condensate with its corresponding oleic acid ester required 247 ppm compared with 492 ppm for the oleic acid ester alone.

EXAMPLE 5

A defoamer composition comprising 30% cetyl oleyl alcohol+30 moles of propylene oxide and 5 moles of ethylene oxide, the oleic acid ester of cetyl oleyl alcohol+30 moles of propylene oxide and 5 moles of ethylene oxide, 17.5% sodium toluene sulphonate and 42.5% water was examined for its defoaming effectiveness in synthetic white water having the approximate composition of the white water found in the average paper mill.

It was found that a dosage of only 6 ppm was required to control any foam formation compared to 15 ppm using the cetyl oleyl alcohol condensate/oleic acid ester blend alone.

EXAMPLE 6

A composition was prepared similar to that of Example 5 but in slightly different proportions as follows: 25.5% of the polyoxyalkylene condensate, 9% of the ester, 17.5% of the sulphonate with the balance water. This composition was added to a disintegrator being used to break down wood chips in the production of mechanical wood pulp.

It was found that an amount of 600 g of the composition per tonne of dry pulp fully effective in controlling foam formation.

I claim:
1. An aqueous defoaming/antifoaming composition which comprises:
   (a) from 5 to 75 parts be weights of a watersoluble non-ionic polyoxyalkylene condensate derived from an active hydrogen-containing precursor or an ester thereof and from at least two alkylene oxides,
   (b) a water-soluble aromatic sulphonate salt of the formula:

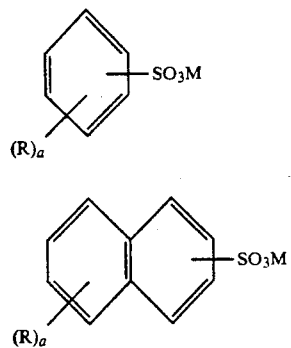

where a is 1 or 2, R is a $C_1$—4 alkyl group which may be the same or different when a is 2 and M is a cation, such that the weight ratio of (b) to (a) is at least 1:15, and
   (c) from 20 to 90 parts by weight of water.
2. A composition according to claim 1 wherein the weight ratio of (b) to (a) is from 1:6 to 6:1.
3. A composition according to claim 1 wherein the total active concentration is 10 to 80% by weight.
4. A composition according to claim 3 wherein the total active concentration is 20 to 60% by weight.
5. A composition according to claim 1 which comprises:
   (a) from 10 to 60 parts by weight of the non-ionic polyoxyalkylene condensate,
   (b) from 10 to 60 parts by weight of the salt, and
   (c) from 30 to 80 parts by weight of water.
6. A composition according to claim 1 wherein the non-ionic polyoxyalkylene condensate is derived from glycerol.
7. A composition according to claim 1 wherein the non-ionic polyoxyalkylene condensate is an ester of a carboxylic acid having 2 to 22 carbon atoms.
8. A composition according to claim 7 wherein the acid is acetic acid.
9. A composition according to claim 7 wherein the acid is oleic acid.
10. A composition according to claim 1 wherein the polyoxyalkylene condensate is a polyoxypropylene polyoxyethylene condensate.
11. A composition according to claim 1 wherein the aromatic sulphonate salt has a molecular weight from 200 to 300.
12. A composition according to claim 1 wherein M is an alkali metal, ammonium or alkanolamine radical.
13. A composition according to claim 1 wherein the aromatic sulphonate salt is sodium xylene sulphonate.
14. A composition according to claim 1 which comprises up to 10% by weight of an anionic surfactant which is a fatty acid sulphonate, alkyl ether phosphate or alkyl sulphosuccinate.
15. A composition according to claim 1 which comprises up to 10% by weight of propylene glycol or isopropanol.
16. A method of treating an aqueous medium so as to reduce or prevent foaming which comprises applying thereto a non-ionic polyoxyalkylene condensate derived from an active hydrogen-containing precursor or an ester thereof and from at least two alkylene oxides and a water-soluble aromatic sulphonate salt of the formula:

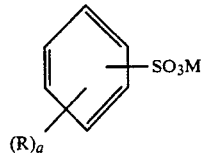

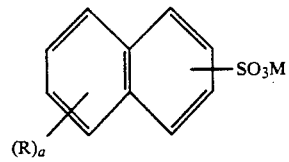

where a is 1 or 2, R is $C_1$-4 alkyl group which may be same or different when a is 2 and M is a cation, such that the weight ratio of (b) to (a) is at least 1:15.
17. A method according to claim 16 wherein the weight ratio of salt to condensate is from 1:6 to 6:1.
18. A method according to claim 16 wherein the non-ionic polyoxyalkylene condensate is derived from glycerol.
19. A method according to claim 16 wherein the non-ionic polyoxyalkylene condensate is an ester of a carboxylic acid having 2 to 22 carbon atoms.
20. A method according to claim 19 wherein the acid is acetic acid.
21. A method according to claim 19 wherein the acid is oleic acid.
22. A method according to claim 16 wherein the polyoxyalkylene condensate is a polyoxypropylene polyoxyethylene condensate.
23. A method according to claim 16 wherein the aromatic sulphonate salt has a molecular weight from 200 to 300.
24. A method according to claim 16 wherein M is an alkali metal, ammonium or alkanoalmine radical.
25. A method according to claim 16 wherein the aromatic sulphonate salt is sodium xylene sulphonate.

* * * * *